Jan. 12, 1965   E. P. BUSILLO ETAL   3,164,989
FLOW RATE INDICATOR
Filed April 29, 1960

INVENTORS
EUGENE P. BUSILLO &
HERBERT J. HAMPEL
BY

ATTORNEYS

United States Patent Office 3,164,989
Patented Jan. 12, 1965

3,164,989
FLOW RATE INDICATOR
Eugene P. Busillo, Huntingdon Valley, and Herbert J. Hampel, Philadelphia, Pa., assignors to Fischer & Porter Company, Hatboro, Pa., a corporation of Pennsylvania
Filed Apr. 29, 1960, Ser. No. 25,582
11 Claims. (Cl. 73—209)

This invention relates generally to flow rate indicators and, more particularly, to magnetic follower mechanisms for use in flow rate indicators or other apparatus for indicating a variable condition.

In flow rate indicators and similar apparatus wherein a magnet is carried by a member movable in accordance with the variations in the flow rate or other variable condition, it is well known to provide a follower magnet magnetically coupled with the magnet carried by the movable member and to provide suitable means operatively associated with the follower magnet to indicate the flow rate or variable condition. One problem that is encountered in devices of this type is that under conditions of violent surging in the flow rate, the movable member and magnet move suddenly a distance sufficient to break the magnetic coupling between the magnet carried by the member and the follower member. If this uncoupling occurs, the follower magnet will no longer function to indicate the flow rate.

It is an object of this invention to provide a magnetic follower means for use in variable condition indicators of the aforementioned type which will not be adversely affected by surging in the variable condition.

Another object of this invention is to provide a magnetic follower means which is adjustable for use with a plurality of variable condition responsive means comprising movable members having different lengths of travel in response to variations in the condition.

The above and other objects and features of the invention will become apparent from a consideration of the following description in conjunction with the drawing wherein.

Figures 1, 2, 3, 4:
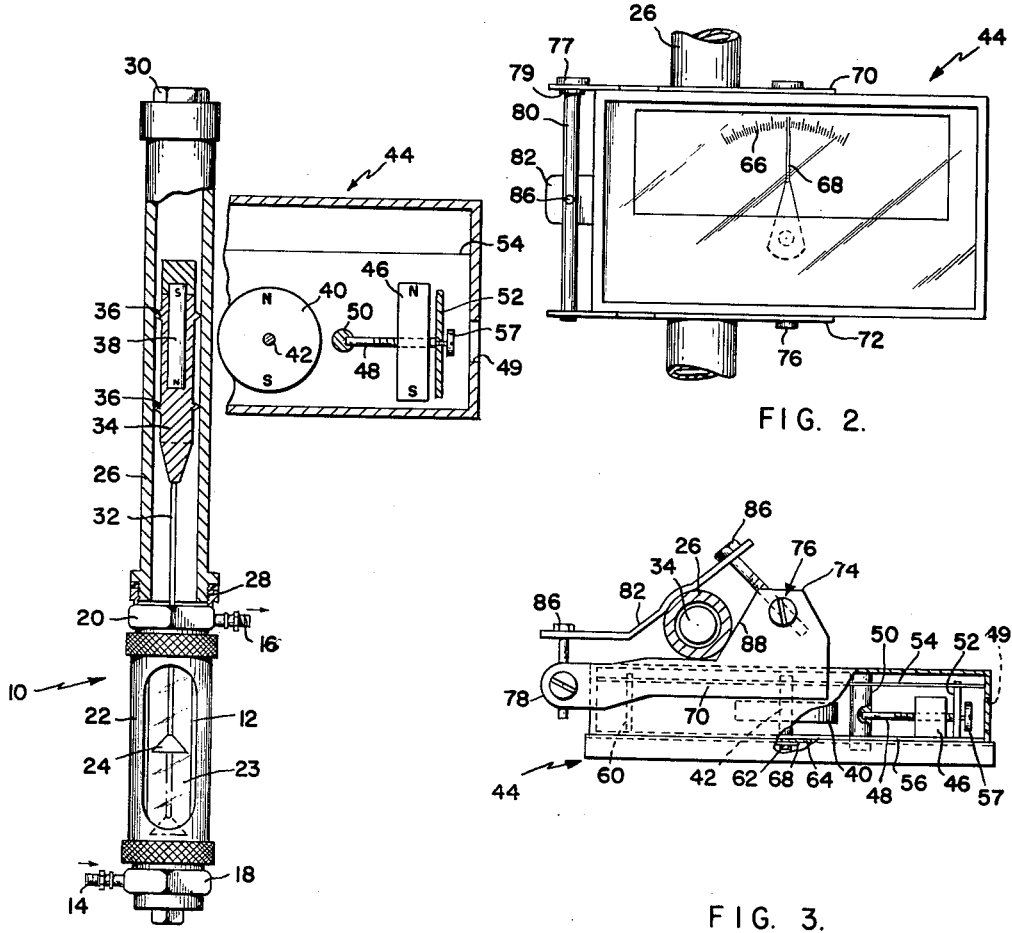
FIGURE 1 is a fragmentary elevational view, partly in section, showing the magnetic follower mechanism in accordance with this invention in conjunction with a flow rate mechanism.
FIGURE 2 is a front elevational view of the apparatus in accordance with this invention mounted on a cylindrical extension of a flow rate mechanism.
FIGURE 3 is a plan view of the apparatus shown in FIGURE 2.
FIGURE 4 is a rear elevational view of the apparatus shown in FIGURE 2.

As best shown in FIGURE 1, the means having a member movable in accordance with the variable condition may comprise a rotameter or flow rate meter 10 having a downwardly tapered vertical metering tube 12 and inlet and outlet connections 14 and 16 formed in lower and upper fittings 18 and 20, respectively. The fittings 18 and 20 are mounted on the body 22 of the rotameter 10 so as to permit independent positioning thereof. A metering float comprises a conical cup-shaped flow-constricting head 24 open at its downward end and disposed within the tube 12. The position of the head 24 within the tube 12 is determined in accordance with the rate of flow of fluid upwardly through the tube 12 in a manner well known in the art.

The body 22 may be provided with a window 23 to permit observation of the position of the head 24 and suitable calibrations may be provided whereby the height of the float can be read off in suitable units.

An elongated cylindrical extension member 26 of non-magnetic material is threadedly attached to the upper fitting 20, as at 28, to extend vertically therefrom. A plug 30 is threaded into the upper end of extension 26. The lower end of extension 26 is open so that the interior thereof communicates with the interior of the metering tube 12 whereby extension 26 is filled at all times with the fluid being metered.

The metering float is provided with an extension rod 32 which extends upwardly from the head 24 and into the interior of extension 26. A body portion 34 is mounted in the upper end of rod 32 and provides weight to the structure comprising body 34, rod 32 and head 24. The body portion 34 is provided with a pair of vertically spaced annular ribs 36 which contact the polished inner wall of extension 26 and serve to center the body portion 34 with extension 26. The ribs 36 are tapered to provide line contact with the inner wall of extension 26 to thereby minimize friction and permit free vertical movement of the head 24 and the body portion 34 in response to the rate of flow of the fluid through the metering tube 12.

The body portion 34 is of non-magnetic material (as for example synthetic plastic or non-magnetic metal, etc.). A bar magnet 38 is positioned within body portion 34 with, by way of example, its south and north poles at the upper and lower ends thereof, respectively. A follower magnet 40, in the form of a disc or wheel is mounted on and keyed to a rod 42 rotatably journalled within a casing generally indicated at 44. Casing 44 is adapted to be mounted on extension 26 with one lateral side of magnet 40 in magnetic clutching relationship with bar magnet 38. The north and south poles of follower magnet 40 are at the upper and lower portions thereof, respectively. The follower magnet 40 is positioned with its north pole magnetically coupled with the south pole of bar magnet 38 and with its south pole magnetically coupled with the north pole of bar magnet 38, as is shown in FIGURE 1. Obviously, the orientation of the north and south poles of magnet 38 as shown in FIGURE 1 may be reversed with a corresponding reversal of the pole orientation of follower maget 40, the essential relationship between magnets 38 and 40 being that the north and south poles of magnet 38 are magnetically coupled with the south and north poles of magnet 40, respectively.

Follower magnet 40 and rod 42 thus rotate in accordance with the vertical movement of bar magnet 38 which movement is responsive to the position of the metering float. A movement of magnet 38 upwardly from the position shown in FIGURE 1 would cause a clockwise rotation of follower magnet 40 with the south pole of follower magnet 40 following the north pole of magnet 38. A movement of magnet 38 downwardly from the position shown in FIGURE 1 would cause a counter-clockwise rotation of follower magnet 40 with the north pole of follower magnet 40 following the south pole of magnet 38.

Mounted on casing 44 adjacent the lateral side of follower magnet 40 opposite from the magnet 38 is is another bar magnet 46 which serves to control or regulate the follower magnet movement. The bar magnet 46 is threadedly mounted on a screw 48 which is horizontally mounted relative to casing 44 with one end supported on a bar 50 and the other end supported on a plate 52. The supported ends of screw 48 are not threaded. As is best shown in FIGURE 3, both the bar 50 and the plate 52 are mounted in supporting panels 54 and 56 which are contained within casing 44.

The end of screw 48 that is mounted in plate 52 has a knob 57 mounted thereon which may serve to rotate screw 48. The screw 48 is restricted from axial movement by rod 50 and plate 52. However, by reason of the threaded engagement between screw 48 and magnet 46, rotation of screw 48 causes movement of magnet 46 toward or away from the follower magnet 40 in accordance with the direction of such rotation. Casing 44 is provided with an access opening 49 adjacent knob 57. A suitable tool, such as a screw driver may be extended through access opening 49 to engage knob 57 for rotation of screw 48. Screw 48 may also be adjusted before being placed in casing 44.

Magnet 46 has its north pole at the upper end thereof and its south pole at the lower end thereof. Magnet 46 thus serves to retard the rotative movement of follower magnet 40 in response to movement of magnet 38 since the south pole of magnet 46 is in repelling relationship with the south pole of follower magnet 40 to hinder counterclockwise rotation thereof and the north pole of magnet 46 is in repelling relationship with the north pole of follower magnet 40 to hinder the clockwise rotation thereof. Magnet 46 thus serves to regulate the amount of rotative movement or adjust the rangeability of follower magnet 40 in accordance with the vertical travel of magnet 38. It will be apparent that by adjusting the position of magnet 46 relative to follower magnet 40, the retarding and ranging effect of magnet 46 may be varied. The closer magnet 46 is positioned to follower magnet 40, the greater will be the retarding effect thereof and the less follower magnet 40 will rotate in accordance with a particular vertical movement of magnet 38. Thus, by adjusting the position of bar magnet 46, the range of the apparatus may be adjusted whereby it may be adapted for use with rotameters or similar devices which are constructed to have various amounts of travel in their variation responsive members carrying the magnets for actuating the follower magnet 40.

It is to be noted that during the movement of magnet 38 downwardly, for example, from the position shown in FIGURE 1 whereby follower magnet 40 is rotated counterclockwise, the north pole of magnet 46 tends to assist this counterclockwise rotation by repelling the north pole of follower magnet 40. However, the repelling force of south pole of magnet 46 acting on the south pole of follower magnet 40 is greater than the above-mentioned north pole repelling force since these south poles are closer to each other than the north poles. Hence, the retarding action of magnet 46 is effective. In actual operation, the angular range of rotation of follower magnet 40 is somewhat less than 180° and generally less than 120°. This is illustrated by referring to FIGURE 1 wherein the follower magnet 40 is in a neutral position with its poles in a vertical axis. Thus, in actual operation, the angle of rotation from this neutral position in either direction will be somewhat less than 90° and generally less than 60°. Thus, there is no danger of the follower magnet 40 being rotated to reverse the positioning of the north and south poles thereof and these north and south poles will at all times be in repelling relationship with the north and south poles of ranging magnet 46.

It is to be noted that the flux pattern of a wheel or disc magnet is contained almost entirely within the wheel. Hence, the follower magnet 40 tends to have a more linear movement than a bar magnet.

The magnetic follower arrangement in accordance with this invention will not be adversely affected by violent surging of the variable condition which causes sudden movement of the magnet 38 by reason of the follower magnet 40 control by the ranging magnet 46. Thus, although the follower magnet 40 may be temporarily broken from magnetic clutching relationship with magnet 38, it will always return to a condition of magnetic clutching once the surging is over. For example, if the body 34 and magnet 38 were moved suddenly downwardly from the position shown in FIGURE 1 such that the magnetic clutching between magnet 38 and follower magnet 40 were broken, the ranging magnet 46 would retain the magnet 40 in a position such as that shown in FIGURE 1. When the body 34 and magnet 38 subsequently return to a more normal position in accordance with a normal flow rate, the follower magnet 40 would seek the magnet 38 and return to a magnetic clutching relationship therewith. Follower magnet 40 would thus again be in a position corresponding to the flow rate through the rotameter 10.

Means are provided for housing the follower mechanism and indicating the variations in the variable condition. Such means comprises the casing 44 which is of a rectangular construction and contains the supporting panels 54 and 56, which rest on the casing bottom, and support plate 52, bar 50 and shaft 42. Bar 50 and plate 52 support screw 48 which carries magnet 46, the latter being prevented from rotation by panel 56. Plate 52 also serves to space the supporting panels 54 and 56 in conjunction with a spacing plate 60. Shaft 42 is keyed to and carrier follower magnet 40 and has one end 62 projecting through panel 56 and through a front panel member 64 of casing 44. The front panel member 64 has suitable scale markings 66 thereon. An indicating pointer 68 is mounted on the shaft 42 at end 62 for movement across the scale markings 66 in accordance with the rotative movement of follower magnet 40 to thereby indicate the flow rate. The casing and other supporting structure for the magnets 40 and 46 are all made of non-magnetic material so that they will not affect the functioning of the magnets 40 and 46.

Means are provided for removably mounting the casing 44 onto a member such as extension 26 of the rotameter. Such means comprises a pair of brackets 70 and 72 mounted on the top and bottom, respectively, of casing 44, as by mounting screws (not shown). Each of the brackets 70 and 72 has a rearwardly projecting portion 74 adapted to vertically support a rod 76 and a laterally projecting portion 78 adapted to vertically support a rod 80. Rods 76 and 80 are rotatable in portions 74 and 76, respectively. The upper ends of rods 76 and 86 have a head 77 and a retaining ring 79 cooperating with bracket 70 to restrict axial movement of rods 76 and 80.

An angular arm 82 having a pair of threaded bolts 84 and 86 extending through the opposite ends thereof may be connected to brackets 70 and 72 by threading bolts 84 and 86 into threaded openings in rods 76 and 80, respectively, at approximately a central position thereof. Since the rods 76 and 80 are rotatable and the bolts 84 and 86 are adjustable to a plurality of axial positions relative to the rods 76 and 80, the clamping apparatus may be used to mount the casing 44 on extension members having various diameters. Brackets 70 and 72 have an angular shaped portion 88 for contacting the extension 26. It will be apparent that threading bolts 84 and 86 into rods 76 and 80, respectively, moves arm 82 and portion 88 into frictional contact with extension 26 to clamp the casing 44 thereon. It is apparent that the mounting means for casing 44 also permits rotatable orientation of casing 42 with respect to the extension 26.

In operation, the ranging magnet 46 is adjustable to a position relative to follower magnet 40 in accordance with the travel of the float member of the flow rate meter so that indicating pointer 68 will not be moved an excessive distance. Then the casing 44 is clamped onto the extension 26 of the rotameter. The follower magnet 40 will thus be magnetically coupled with the magnet 38 carried by the metering float body 34. As the magnet 38 moves vertically, the follower magnet 40 will rotate therewith causing a corresponding rotation of shaft 44 and indicating pointer 68. Indicating pointer 68 will thus indicate the flow rate on the scale 66. As viewed in FIGURE 1, downward movement of magnet 38 causes counterclockwise rotation of follower magnet 40 and a corresponding movement of pointer 68 and upward movement of magnet 38 causes clockwise rotation of follower magnet 40 and pointer 68.

The magnet follower mechanism in accordance with this invention is useable in many types of apparatus for indicating a variable condition which includes a magnet member, such as magnet 38, movable in response to variations in the condition. For example, the follower mechanism is useable in thruflow meters in which the fluid flows straight thru the meter and a magnet is movably positioned within the metering chamber.

It is apparent that the invention can be variously embodied and changes may be made in the arrangement and construction of parts without departing from the scope of the invention. Thus, it is not desired to be limited except as required by the appended claims.

What is claimed is:

1. In an apparatus for indicating a variable condition including a magnet member movable in response to variations in said condition, the combination comprising a support means, a follower magnet movably supported by said support means, said follower magnet being magnetically coupled with the magnet member during normal variations of said condition, and a control magnet supported by said support means and magnetically coupled with said follower magnet to tend to restrict the following movement thereof in accordance with the magnet member movement whereby said control magnet ranges said follower magnet movement.

2. In an apparatus for indicating a variable condition including a magnet member movable in response to variations in the condition, the combination comprising a support means, a follower magnet movably supported by said support means, said follower magnet being magnetically coupled with the magnet member during normal variations of said condition, and a control magnet supported by said support means and magnetically coupled with said follower magnet to tend to retard the following movement thereof in accordance with the magnet member movement whereby said control magnet ranges said follower magnet movement, said control magnet being adjustable toward and away from said follower magnet to vary the retarding effect thereof and the follower magnet movement in accordance with the travel of the magnet member.

3. Apparatus as claimed in claim 2 wherein said follower magnet comprises a rotatably mounted magnetic disc, the magnet member and said control magnet being mounted adjacent the edge of said disc in opposite radial directions from the axis of said disc.

4. Apparatus as claimed in claim 3 including means operatively connected with said rotatable disc for rotation therewith and for indicating said variable condition.

5. In an apparatus for indicating a variable condition including a magnet member movable in response to variations in said condition, the combination comprising a support means, a follower magnet movably supported by said support means, said follower magnet having its north pole in magnetic attracting relationship with the magnet member's south pole and its south pole in magnetic attracting relationship with the magnet member's north pole, and a control magnet supported by said support means and magnetically coupled with said follower magnet to tend to restrict the following movement thereof in accordance with the magnet member movement, said control magnet having its north pole in magnetic repelling relationship with said follower magnet's north pole and its south pole in magnetic repelling relationship with said follower member's south pole whereby said control magnet ranges said follower magnet movement.

6. Apparatus as claimed in claim 5 wherein said control magnet is adjustable toward and away from said follower magnet to vary the ranging effect thereof and the amount of follower magnet movement in accordance with the travel of the magnet member.

7. In an apparatus for indicating a variable condition, said apparatus including a magnet member movable in response to variations in the variable condition, the combination comprising a support means, a follower magnet supported by said support means in magnetic coupling relationship with the magnet member and for movement in accordance with the magnet member movement, and means for varying the amount of follower magnet movement in accordance with the travel of the movable magnet member, said last-named means comprising a control magnet movable toward and away from said follower magnet and in magnetic coupling relationship therewith, the poles of said follower and control magnets being arranged so that movement of said control magnet toward said follower magnet increases the strength of the magnetic coupling therebetween and vice versa.

8. Apparatus as claimed in claim 7 wherein said follower magnet comprises a disc magnet and including a shaft supporting said disc magnet in said support means for rotatable movement and operatively connected to said disc magnet for rotation therewith, and an indicating member mounted on said shaft whereby said indicating member moves in accordance with the follower magnet movement to indicate the variable condition.

9. In an apparatus for indicating a variable condition including a magnet member movable in response to variations in the condition, the combination comprising a support means, a follower magnet movably supported by said support means, said follower magnet being magnetically coupled with the magnet member during normal variations of said condition, and a control magnet supported by said support means and magnetically coupled with said follower magnet to tend to retard the following movement thereof in accordance with the magnet member movement whereby said control magnet ranges said follower magnet movement, said control magnet being adjustable toward and away from said follower magnet to vary the retarding effect thereof and the follower magnet movement in accordance with the travel of the magnet member, said control magnet being positioned adjacent said follower magnet to magnetically bias said follower member toward a normal position, said control magnet moving said follower magnet towards said normal position upon magnet member movement breaking said magnetic coupling between the magnet member and said follower magnet whereby when the magnet member returns to a normal position, said follower magnet returns to magnetic coupling relationship therewith.

10. Apparatus for indicating the rate of flow of a fluid comprising means defining a flow path for a fluid, means movable in response to variations in the rate of flow of fluid through said flow path, said movable means having a magnet member movable therewith, a support means, a follower magnet supported by said support means in magnetic coupling relationship with said magnet member and for movement in accordance with the magnet member movement, means for varying the amount of follower magnet movement in accordance with the travel of the movable magnet member, said last-named means comprising a control magnet in magnetic coupling relationship with said follower magnet, means mounting said control magnet for movement toward and away from said follower magnet with each of the control magnet poles being kept an equal distance from said follower magnet, said follower magnet comprising a disc magnet, a shaft supporting said disc magnet on said support means for rotatable movement and operatively connected to said disc magnet for rotation therewith, and an indicating member mounted on said shaft whereby said indicating member moves in accordance with the follower magnetic movement to indicate variations in the rate of flow of fluid through said flow path.

11. Apparatus for indicating the rate of flow of a fluid comprising means defining a flow path for a fluid, means movable in response to variations in the rate of flow of fluid through said flow path, said movable means having a magnet member movable therewith, a support means, a follower magnet supported by said support means in magnetic coupling relationship with said magnet member and for movement in accordance with the magnet member movement, and means for varying the amount of follower magnet movement in accordance with the travel of the movable magnet member, said last-named means comprising a control magnet in magnetic coupling relationship with said follower magnet, means mounting said control magnet for movement toward and away from said follower magnet with each of the control magnet poles being kept an equal distance from said follower magnet.

References Cited in the file of this patent

UNITED STATES PATENTS

| | | |
|---|---|---|
| 1,746,627 | Babbitt | Feb. 11, 1930 |
| 2,011,775 | Reichel et al. | Aug. 20, 1935 |
| 2,032,306 | Pratt | Feb. 25, 1936 |
| 2,155,712 | Hull | Apr. 25, 1939 |
| 2,311,952 | Martin | Feb. 23, 1943 |
| 2,405,050 | Pfuntner et al. | July 30, 1946 |
| 2,414,688 | Chambers | Jan. 21, 1947 |
| 2,425,691 | Brewer | Aug. 12, 1947 |
| 2,440,535 | Baranowski | Apr. 27, 1948 |
| 2,519,058 | Lundberg et al. | Aug. 15, 1950 |
| 2,574,866 | Fahrlander | Nov. 13, 1951 |
| 2,688,456 | Jensen | Sept. 7, 1954 |
| 2,709,755 | Potter | May 31, 1955 |
| 2,940,044 | Warsaw | June 7, 1960 |